United States Patent [19]

Fukutome et al.

[11] Patent Number: 4,993,376

[45] Date of Patent: Feb. 19, 1991

[54] SPRING SYSTEM

[75] Inventors: Taizo Fukutome, Saitama; Atsushi Ishida, Kanagawa; Akihiko Inooku, Tokyo; Noritoshi Takamura; Kaoru Hatayama, both of Nagano; Yuichi Nagase, Kanagawa; Toyoyuki Higashino, Kanagawa; Hideo Yamamoto, Kanagawa, all of Japan

[73] Assignee: Honda Giken Kogyo Kabushiki Kaisha NHK Spring Co., Ltd., Japan

[21] Appl. No.: 345,328

[22] Filed: Apr. 28, 1989

[30] Foreign Application Priority Data

Apr. 29, 1988 [JP] Japan ................................ 63-106739

[51] Int. Cl.$^5$ .............................................. F01L 3/10
[52] U.S. Cl. ............................ 123/90.65; 123/90.67; 267/166; 267/170
[58] Field of Search ............... 123/90.65, 90.66, 90.67; 267/166, 170, 179, 286

[56] References Cited

U.S. PATENT DOCUMENTS

| | | | |
|---|---|---|---|
| 1,595,317 | 8/1926 | Scholey | 123/90.67 |
| 1,878,128 | 9/1932 | Griswold | 123/90.67 |
| 4,162,064 | 7/1979 | Bouton et al. | 267/179 |
| 4,432,311 | 2/1984 | Holtzberg et al. | 123/90.67 |
| 4,515,346 | 5/1985 | Gaterman, III | 123/188 SB |
| 4,527,774 | 7/1985 | Showalter | 123/90.65 |
| 4,564,775 | 1/1986 | Mazzorana | 123/41.12 |
| 4,665,869 | 5/1987 | Hinz et al. | 123/90.67 |
| 4,807,859 | 2/1989 | Bolthouse | 267/170 |

Primary Examiner—David A. Okonsky
Assistant Examiner—Weilun Lo
Attorney, Agent, or Firm—Skjerven, Morrill, MacPherson, Franklin & Friel

[57] ABSTRACT

A spring system for applying a restoring force to a reciprocating member such as an exhaust or intake valve of an internal combustion engine, comprising: a helical spring having open ends and consisting of titanium or an alloy thereof; and a spring seat supporting one of the two ends of the helical spring. Since this helical spring is provided with open ends, mutual striking of the coil wire can be avoided and, thereby, the durability of the helical spring can be ensured in addition to the advantage obtained from the low-mass and high transverse elastic modulus of titanium or its alloy.

11 Claims, 5 Drawing Sheets

SPRING SYSTEM

TECHNICAL FIELD

The present invention generally relates to a spring system for applying a restoring force or other urging force to a reciprocating member, and in particular to a spring system which is suitable for use as valve springs for intake valves and exhaust valves in reciprocating internal combustion engines which are adapted for high speed operation.

BACKGROUND OF THE INVENTION

In a reciprocating internal combustion engine, intake and exhaust valves are urged towards their closed positions by valve springs consisting of helical compression springs, and are closed and opened by transmitting drive forces from cams which are rotated in synchronism with the rotation of the engine to the stem ends of the valves via rocker arms. Such helical springs are provided with closed and ground ends so that they may stand upright and no localized stress may be generated in the areas of contact between the helical compression springs and spring retainers supporting them.

The output of an engine can be increased by increasing its maximum rotational speed, but it is limited by the occurrence of leaping and surging of the valves due to the resonance of the valve spring system. Japanese patent publication No. 47-22363 discloses a technology for elevating the resonance point of a valve spring system by giving a non-linear property to the valve springs through uneven distribution of the winding pitch.

As an alternate approach to elevating the resonance point of the valve spring system, there is a possibility of manufacturing valve springs with such materials as titanium alloys which have high mechanical strengths for their weights and high modulii of transverse elasticity. According to the experiments conducted by the inventors, it was discovered that the resonance frequency of the valve spring system can be increased by using titanium alloys and increasing the spring constant of the spring while reducing its weight.

However, it was also discovered that after being used in an internal combustion engine which was operated at high speed over an extended time period, the valve springs, in particular, their end portions became excessively worn and through increase in the stress acting in those parts the valve springs tended to be prematurely and permanently deformed and, in some cases, actually broke. Presumably, such premature wears were caused by the mutual striking of different parts of the coil wire in the end portions of the helical springs.

BRIEF SUMMARY OF THE INVENTION

In view of such findings by the inventors and the problems of the prior art, a primary object of the present invention is to provide a high performance spring system which permits high speed operation of mechanical systems such as internal combustion engines.

A second object of the present invention is to provide such a spring system which is durable.

A third object of the present invention is to provide such a spring system which is easy to manufacture.

These and other objects of the present invention can be accomplished by providing: a spring system for applying a restoring force to a reciprocating member, comprising: a helical compression spring having open ends and consisting of titanium or an alloy thereof; and a spring seat supporting one of the two ends of the helical spring. Preferably, the helical spring has a uniform coil pitch over its entire length.

Thus, mutual striking of the coil wire can be avoided and, thereby, the durability of the helical spring can be ensured in addition to the advantage obtained from the low-mass and high transverse elastic modulus of titanium or its alloy.

Preferably, the spring seat is provided with a flange abutting the end surface of the helical spring, and a cylindrical part coaxially extending from the flange into the helical spring so that the end portions of the helical spring may be supported without creating the problems of localized stress. According to a preferred embodiment, the flange is provided with an annular shoulder surface which is contoured to evenly support the end surface of the helical spring. Alternatively, an end portion of the helical spring is insert molded in the flange of the spring seat. In such cases, the coil wire ends may be evenly supported and the helical spring can stand upright even when the wire ends of the spring are left unground. In either case, the springs seats may be made of either resin material or metallic material such as aluminum or its alloy.

According to a certain feature of the present invention, each of the spring seats is provided with a cylindrical projection extending into the valve spring and, optionally, lightly touching the inner surface of the valve spring. This cylindrical portion is not only effective in guiding the normal deformation of the valve spring at its end portion but also helpful in suppressing the occurrence of surging through the damping effect produced by mutual sliding contact between the cylindrical portion and the inner surface of the valve spring. Alternatively, such a cylindrical portion may extend from the spring seat and surround the valve spring. In the latter case, by suitable selection of the material and diameter of the coil wire, the external dimension of the coil wire may be reduced, thereby making the use of such a valve spring highly suitable in small engines and those engines where a large number of valves are provided for each cylinder.

BRIEF DESCRIPTION OF THE DRAWINGS

Now the present invention is described in the following in terms of specific embodiments with reference to the appended drawings, in which.

DESCRIPTION OF THE PREFERRED EMBODIMENTS

Figure 1:
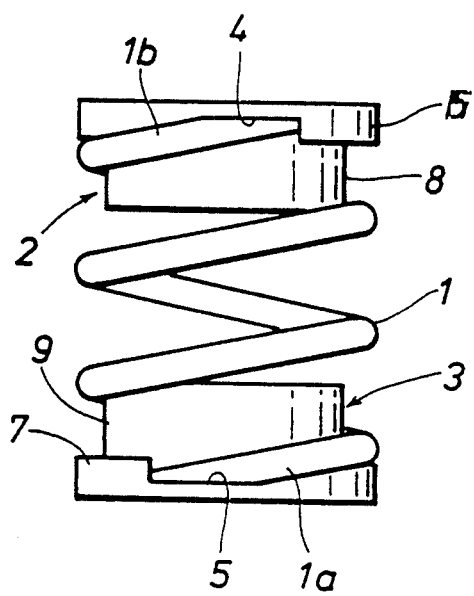
FIG. 1 is a side view of a first embodiment of the spring system according to the present invention which comprises a helical compression spring and springs seats and is constructed as a valve spring system.

FIG. 1 shows a spring system according to the present invention which comprises a valve spring 1 and spring seats 2 and 3 supporting the respective ends of the valve spring 1. The valve spring 1 is made of a titanium alloy of a beta alloy type having the composition of Ti-13V-11Cr-3Al, and has the following specifications: wire diameter 3.9 mm; average coil diameter 24.6 mm; total number of coils 4.2; number of active coils; 3.0; and free state length 35.5 mm. The spring seats 2 and 3 may consist of polyimide resin such as Vespel (trade name: duPont), or aluminum or aluminum alloy.

Conventionally, the two ends of valve springs consisted of closed ends, and were additionally ground to have flat end surfaces (JIS 2704). On the other hand, according to the present invention, the valve spring 1 of the valve spring system is provided with open ends 1a and 1b, wound by even pitch over its entire length, and ground at the end surfaces of the coil wire so as to have flat end surfaces. The spring seats 2 and 3 are cylindrical and hollow, and are each provided with a flange 6 or 7 at its outer end and a coaxial cylindrical portion 8 or 9 at its inner end. Thus, the outer ends 1a and 1b of the valve spring 1 are each supported by a shoulder surface 4 or 5 defined between the flange 6 or 7 and the cylindrical portion 8 or 9 of the corresponding spring seat 2 or 3.

Figure 2:
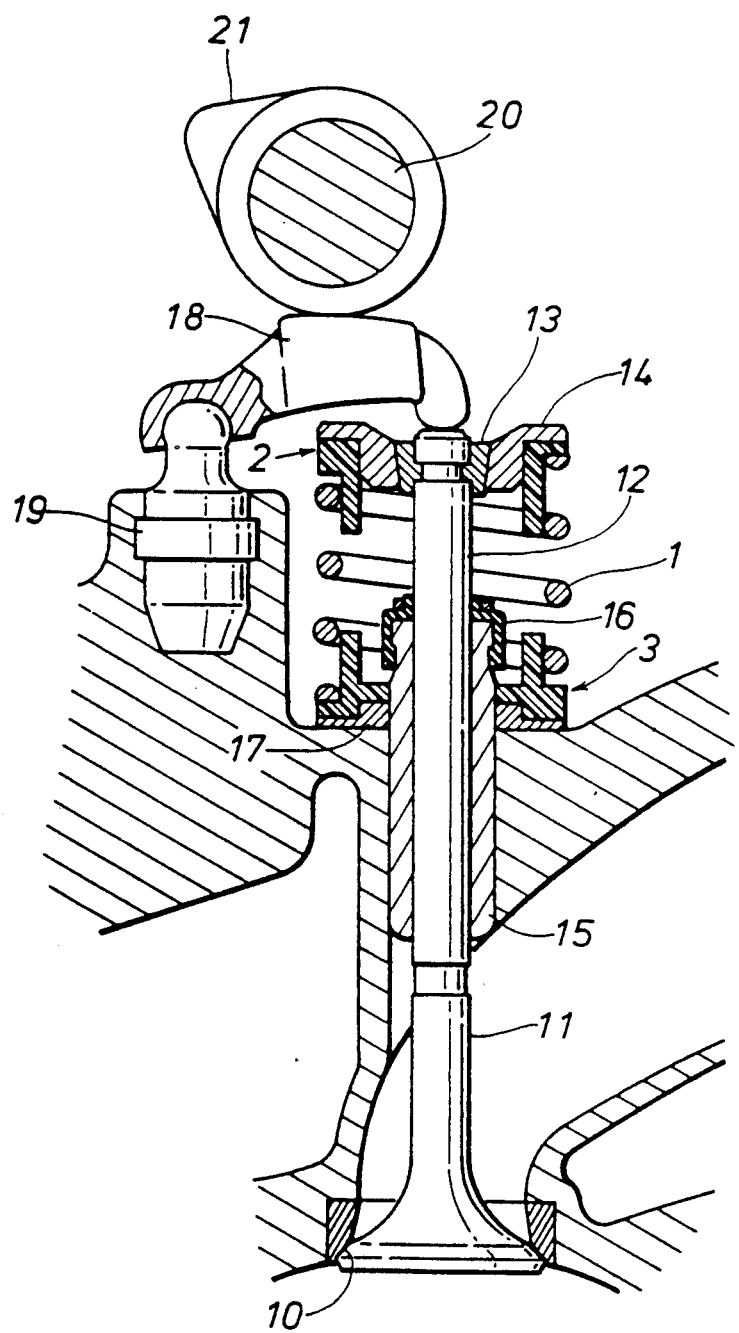
FIG. 2 is a fragmentary sectional view of a valve drive mechanism to which the valve spring system of FIG. 1 is applied.

FIG. 2 shows how this valve spring 1 and the spring seats 2 and 3 are actually used. A valve 11 selectively communicates the combustion chamber of an internal combustion engine with an intake passage or an exhaust passage by cooperating with a valve seat 10 defined in the cylinder head, as an intake valve or an exhaust valve as the case may be. The stem 12 of the valve 11 is slidable received in a valve guide 15 which is in turn press fitted into the cylinder head, and one of the spring seats 2 is engaged with the outer end of the stem 12 by means of a split cone 13 and an annular spring retainer 14. The other spring seat 3 is supported by an annular planar surface defined in a part of the cylinder head surrounding the valve guide 15 with a spring spacer 17 shaped as a washer and made of metallic material or heat resistant resin material interposed between the cylinder head surface and the spring seat 3. Numeral 16 denotes a stem oil seal for preventing the infiltration of oil into the combustion chamber.

To the outer end surface of the stem 12 abuts an end of a rocker arm 18 whose other end is pivotally supported by the cylinder head via a lash adjuster 19. A cam profile surface 21 of the camshaft 20 abuts an intermediate part of the rocker arm 17. Therefore, according to this embodiment, as the camshaft 20 is rotatively driven, the rocker arm 18 rotates downwardly around the lash adjuster 19 by being driven by the cam profile surface 21, and the stem 12 of the valve 11 is moved downwardly in FIG. 2 against the biasing force of the valve spring 1, thereby opening the valve 11.

Figure 3:
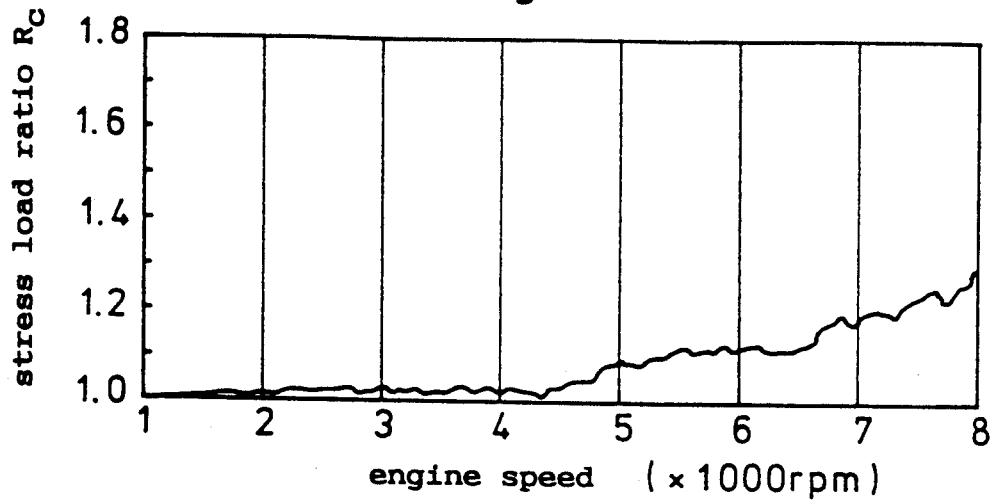
FIGS. 3 through 5 are graphs showing the stress load ratios of various valve springs measured in relation with the rotational speed of the engine.
Figure 4:
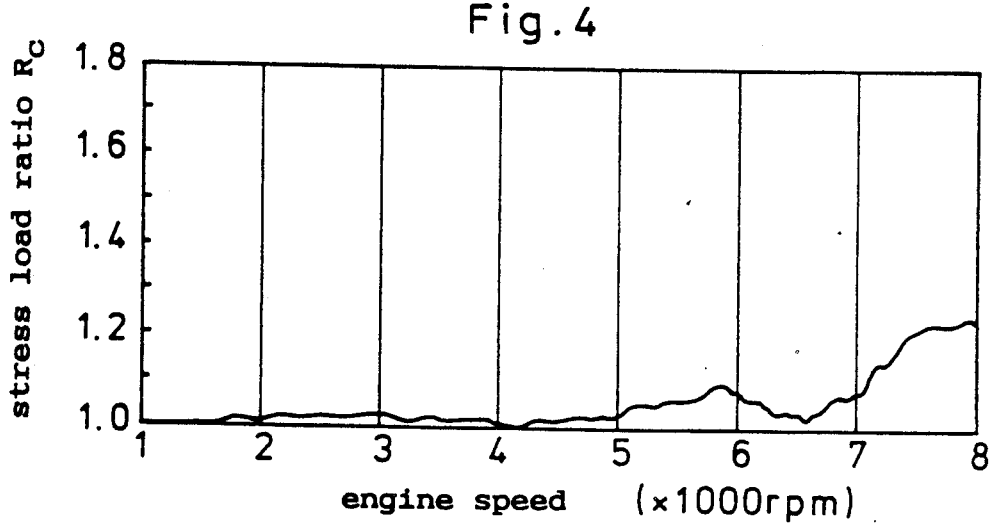
Figure 5:
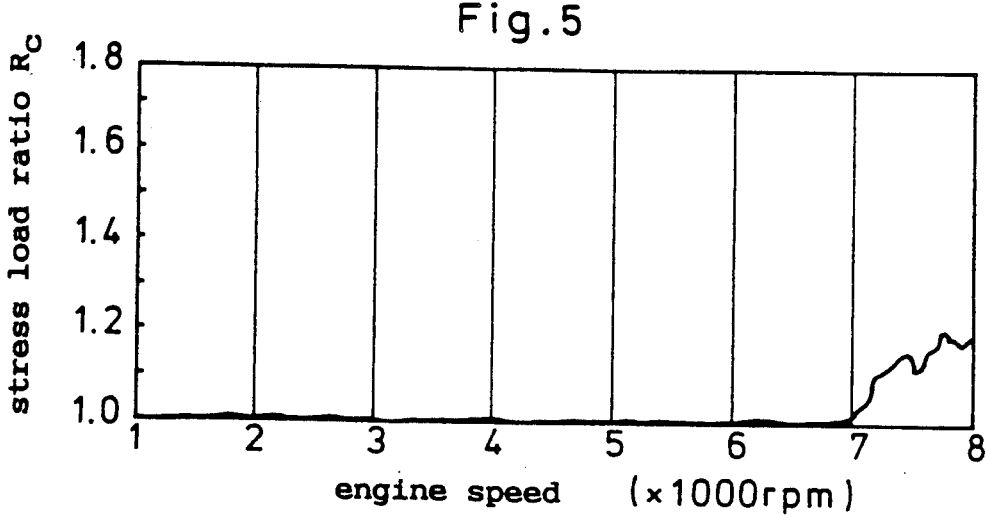

FIGS. 3 through 5 show graphs in each of which the vertical axis corresponds to the stress load ratio (Rc=measured stress/design stress) and the horizontal axis corresponds to the rotational speed of the engine.

FIG. 3 corresponds to the case in which a valve spring of a conventional configuration (uneven two-stage pitch helical spring in which the coil pitch is larger in its middle portion than in its end portions) made of titanium alloy was used, and, according to this graph, the valve demonstrated substantially no leaping or surging even when the engine was operated at fairly high speed but a ten to thirty percent increase in stress occurred when the rotational speed of the engine exceeded 5,000 rpm.

FIG. 4 corresponds to the case where the spring seats were made of aluminum alloy, and the increase in the stress of the valve spring was controlled up to the point where the rotational speed exceeded 7,000 rpm.

FIG. 5 shows a similar graph corresponding to the case where the spring seats were made of polyimide resin, and substantially no increase in stress was observed up to the rotational speed of 7,000 rpm.

Figure 6:
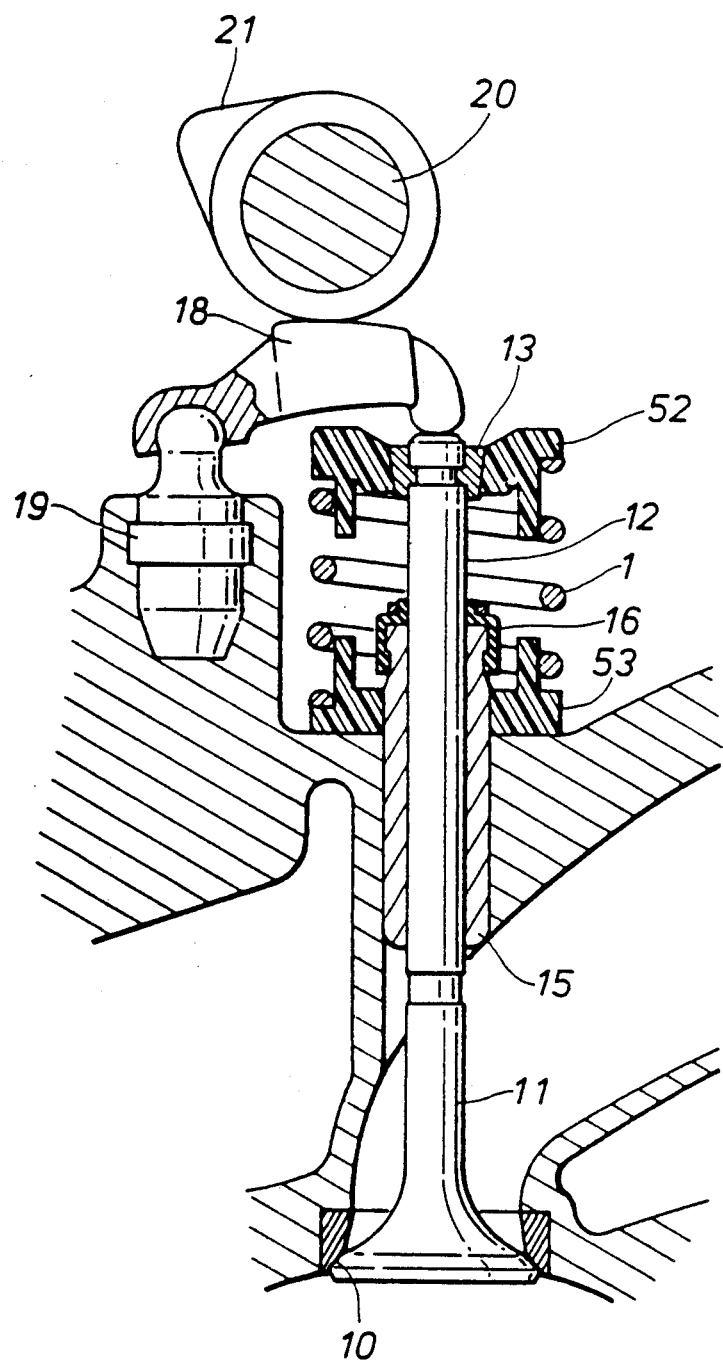
FIG. 6 is a view similar to FIG. 2 showing a second embodiment of the valve spring system of the present invention.

FIG. 6 shows a second embodiment of the present invention, and the parts corresponding to those of the previous embodiment are denoted with like numerals without repeating their detailed description. The lower spring seat 53 is directly supported by the cylinder head while the upper spring seat 52 supports the upper end of the valve spring 1 and is directly engaged with the stem 12 of the valve 11 by way of a split cone 13 only. According to this embodiment, since the spring seats and the spring retainers are made of a same material and formed as integral units (or, in other words, spring retainers are omitted), reduction in overall mass as well as the number of component parts can be achieved.

Figure 7:
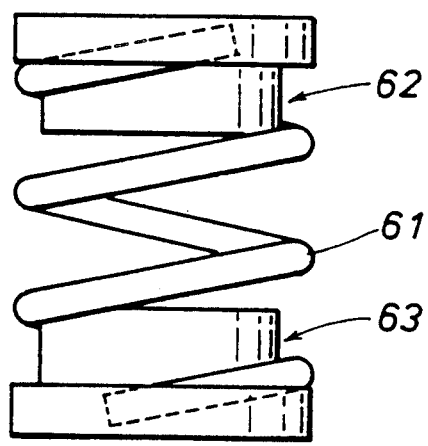
FIG. 7 is a view similar to FIG. 1 showing a third embodiment of the valve spring system of the present invention.

FIG. 7 shows a third embodiment of the present invention, in which each end of the valve spring 61, which is again formed as an open end, is simply insert molded in spring seats 62 and 63 made of resin material without being ground. Even when these spring seats are made of metallic materials such as aluminum alloy, it is possible to perform similar insert molding.

Figure 8:
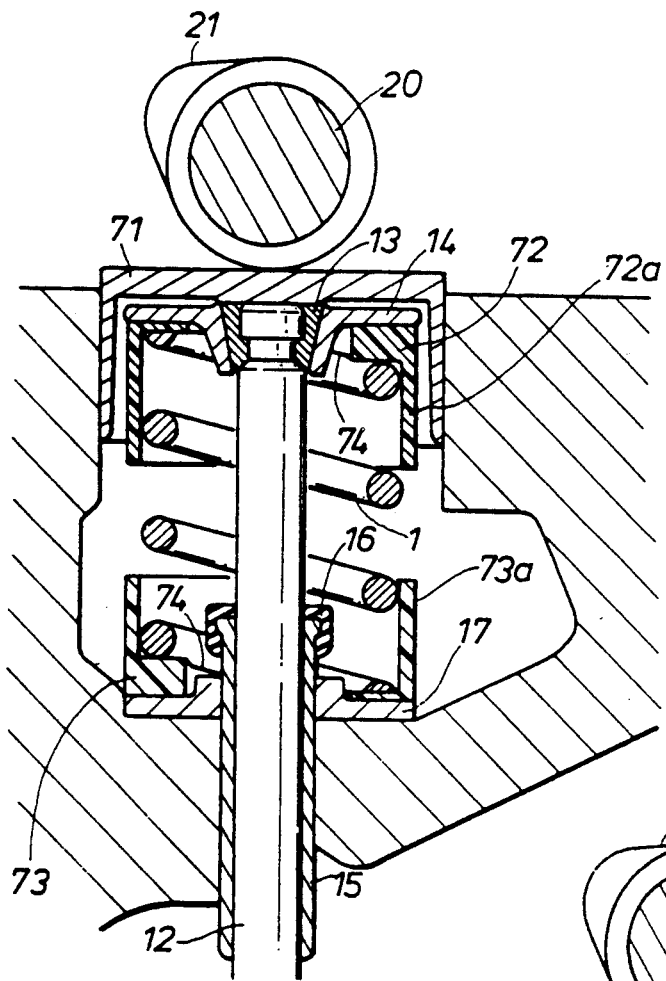

FIG. 8 shows a fourth embodiment of the present invention which is applied to a bucket tappet type timing gear of an OHC engine in which the valve stem 12 is actuated by the cam profile surface 21 via a bucket tappet 71 alone. According to this embodiment, the end portions of the valve spring 1 are supported by shoulder surfaces 74 of the corresponding spring seats 72 and 73 which are contoured so as to evenly support the end portions of the valve spring 1 by being provided with sloping surfaces extending along the circumferential direction, and, additionally, hollow cylindrical portions 72 and 73 extend coaxially from the valve spring 72 and 73 into the valve spring 1 toward each other. These cylindrical portions 72a and 73s are lightly in contact with the part of the coil wire located in the inner circumferential surface of the valve spring 1.

Thus, according to this embodiment, since the spring end portions are open-ended and evenly supported by the shoulder surfaces 74, mutual striking of the coil wire in such regions is avoided, and the coil wire is free from localized stresses. Furthermore, an appropriate degree of friction which occurs between the coil wire and the cylindrical portions 72a and 73a prevents the surging of the valve spring 1, and contributes to the improvement of the performance of the engine. In particular, by providing the cylindrical portions 72a and 73a around the valve spring 1, instead of inside the valve spring as was the case in the embodiment illustrated in FIGS. 1 and 2, the diameter of the valve spring 1 may be reduced by appropriately selecting the material and the diameter of the coil wire. This is advantageous in applications where a large number of valves are provided to each cylinder of the engine as well as in small engines.

Figure 9:
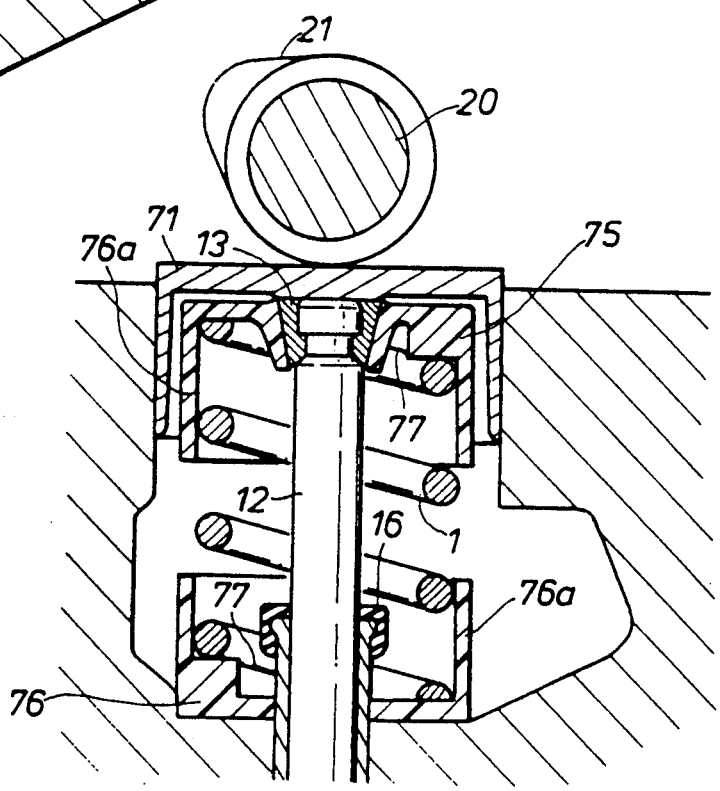

FIG. 9 shows an embodiment similar to that illustrated in FIG. 8, but this embodiment differs from the previous embodiment in that the spring retainers 14 and 17 are integrally incorporated with the corresponding spring seats 75 and 76. In other words, the present embodiment eliminates the need for spring retainers 14 and 17. In this embodiment also, the end portions of the valve spring 1 are supported by shoulder surfaces 77 which are provided in the corresponding spring seats 75 and 76 and given with sloping surfaces extending along the circumferential direction, and cylindrical portions 75a and 76a extend from the corresponding spring seats 75 and 76 along the outer circumferential surface of the valve spring 1. This embodiment offers the advantage of reducing the mass of the moving parts of the valve mechanism through elimination of the spring retainers 14 and 17 in addition to those obtained by the previous embodiment.

Thus, according to the present invention, the maximum operating speed of mechanical systems such as internal combustion engines can be increased by using titanium or titanium alloys having low masses, high mechanical strengths, and high modulii of transverse elasticity. In particular, because the abnormal wears due to mutual striking of different parts of the coil wire can be prevented and a certain damping effect can be produced due to the viscoelastic property of the spring seats or the friction loss between the spring seats and the spring, a significant advantage can be obtained in increasing the maximum operating speed of mechanical systems such as internal combustion engines.

Although the above embodiments pertained to the cases where the present invention was applied to internal combustion engines, the present invention is not limited to the applications of internal combustion engines, but may also be applied to any mechanical systems where a restoring force is to be applied to a reciprocating member.

What we claim is:

1. A spring system for applying a restoring force to a reciprocating member, comprising:
    a helical compression spring comprising an intake valve spring or an exhaust valve spring for an internal combustion engine, said spring having open ends and consisting of titanium or an alloy thereof; and
    a spring seat supporting one of the two ends at said helical spring.

2. A spring system according to claim 1, wherein said helical spring has a uniform coil pitch over its entire length.

3. A spring system according to claim 1, wherein said spring seat is provided with a flange abutting said end surface of said helical spring, and a cylindrical part coaxially extending from said flange into said helical spring.

4. A spring system according to claim 3, wherein said flange is provided with an annular shoulder surface which is contoured to evenly support said end surface of said helical spring.

5. A spring system according to claim 1, wherein said spring seat is provided with a flange abutting said end surface of said helical spring, and a hollow cylindrical part coaxially extending from said flange so as to surround said helical spring.

6. A spring system according to claim 5, wherein said flange is provided with an annular shoulder surface which is contoured to evenly support said end surface of said helical spring.

7. A spring system according to claim 1, wherein said spring seat is made of resin material.

8. A spring system according to claim 1, wherein said spring seat is made of aluminum or an alloy thereof.

9. A spring system according to claim 7 or 8, wherein an end portion of said helical spring is insert molded in said flange of said spring seat.

10. A spring system according to claim 1, wherein a valve stem is passed through said helical spring, and a free end of said valve stem is directly engaged to said spring seat.

11. A spring system according to claim 1, wherein a valve stem is passed through said helical spring, and a free end of said valve stem is engaged to said spring seat via a spring retainer.

* * * * *